United States Patent [19]

Swick et al.

[11] Patent Number: 4,572,717

[45] Date of Patent: Feb. 25, 1986

[54] TENSION INDICATING WASHER IMPROVEMENTS

[75] Inventors: Edwin G. Swick, Bartlett, Ill.; Jerold M. Forsberg, Washington, D.C.

[73] Assignee: Illinois Tool Works Inc., Chicago, Ill.

[21] Appl. No.: 520,279

[22] Filed: Aug. 4, 1983

[51] Int. Cl.[4] ............................................. F16B 31/02
[52] U.S. Cl. ...................................... 411/11; 411/544
[58] Field of Search .................... 411/10, 8, 9, 11, 14, 411/12, 13, 259, 261, 531, 544

[56] References Cited

U.S. PATENT DOCUMENTS

| | | | |
|---|---|---|---|
| 3,072,093 | 1/1963 | Lanius | 411/8 |
| 3,153,974 | 10/1964 | Canning | 411/13 |
| 3,169,440 | 2/1965 | Taylor | 411/11 |
| 3,329,058 | 7/1967 | Cumming | 411/11 |
| 4,131,050 | 12/1978 | Holmes | 411/10 |
| 4,149,446 | 4/1979 | Spengler | 411/11 |
| 4,293,257 | 10/1981 | Peterson | 411/11 |
| 4,371,293 | 2/1983 | Wilcox | 411/531 X |

*Primary Examiner*—Gary L. Smith
*Assistant Examiner*—Adrian H. Whitcomb, Jr.
*Attorney, Agent, or Firm*—J. P. O'Brien; J. R. Halvorsen; T. W. Buckman

[57] ABSTRACT

A tension indicating device which includes at least one indicating arm and reference means carried by a stamped generally frustoconical spring washer. A relieved area in the bearing surface of the washer prevents work surface irregularities from producing erroneous tension indications. The arm and reference means may mechanically engage one another and the arm may be made separately and attached to the washer. Indications made by the arm are designed to be visually discernable from a distance.

2 Claims, 28 Drawing Figures

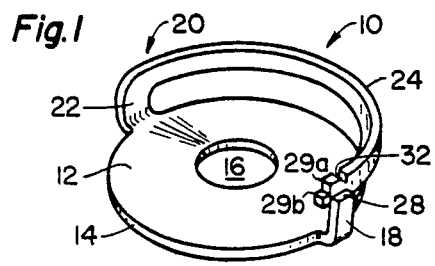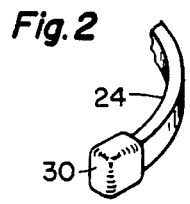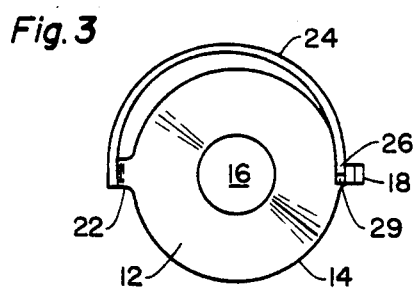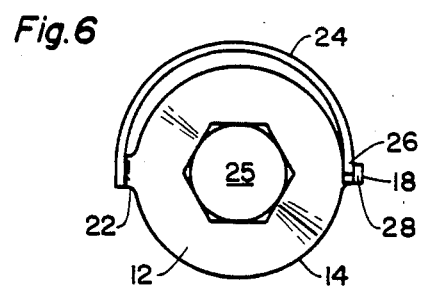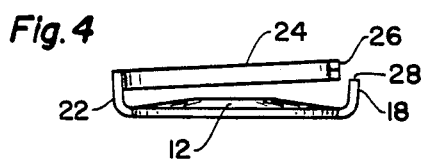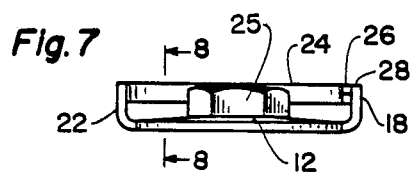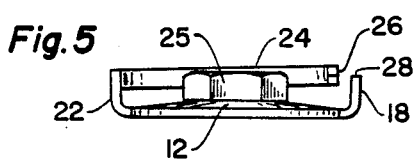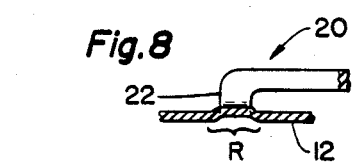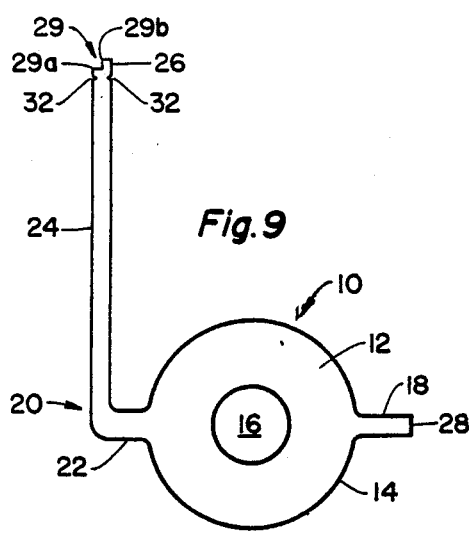

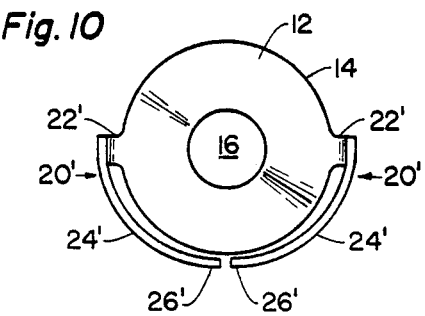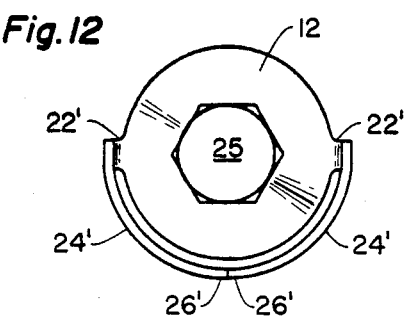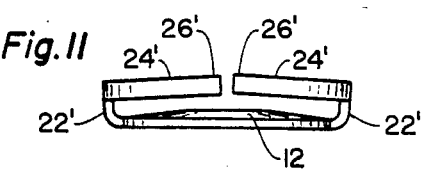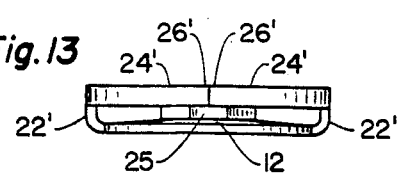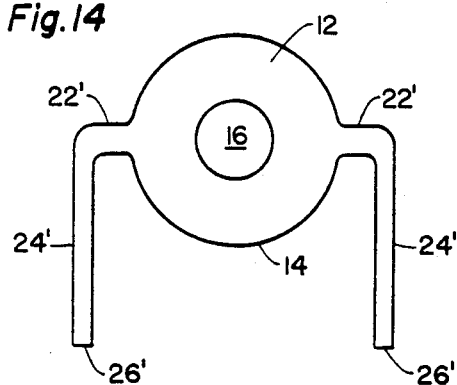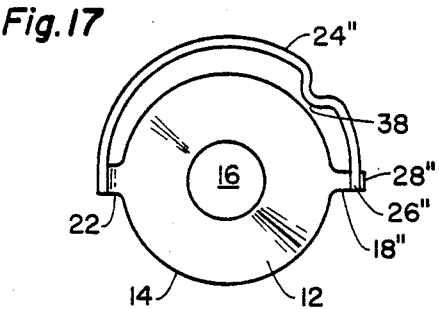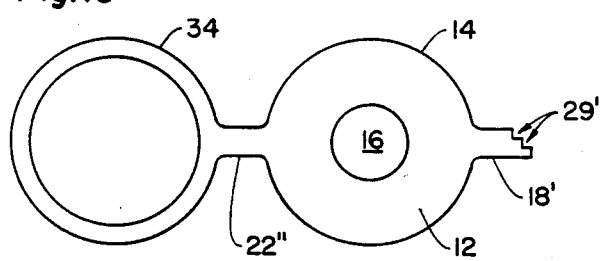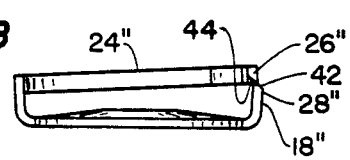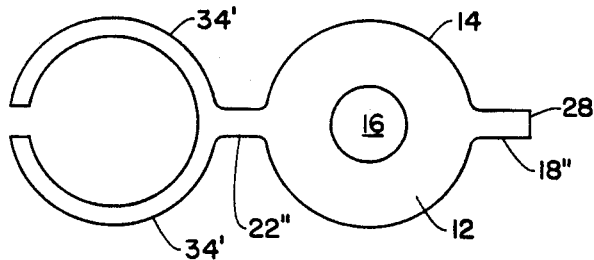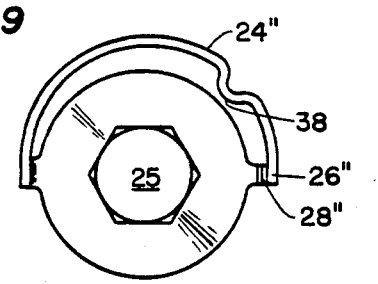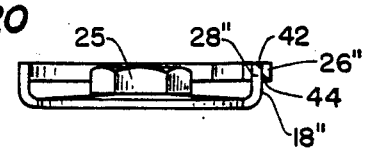

TENSION INDICATING WASHER IMPROVEMENTS

BACKGROUND OF THE INVENTION

The present invention relates to tension indicating devices and particularly to devices in the nature of washers which can be used to give a measure of the tension which has been induced in a bolt. Applicant, by this invention, has solved the problem of knowing when a bolt is no longer properly tensioned.

This invention is particularly, although not exclusively, useful in its application to bolts used in the assembly of towers for supporting electric transmission lines, for the support of rock formations in mines and tunnels and the assembly of structures such as bridges. The problem encountered and answered by the instant invention in regard to transmission towers is that the bolts used in the assembled tower are required to have a minimum amount of tension therein to insure proper assembly and safety to those persons and property in the immediate proximity of the tower. Obviously, when the bolts have lost their tension, in a tower of this type, an unsafe situation arises wherein collapse of the tower can jeopardize individuals and property. Another situation where the indicating washer is of particular value is in its use with bolts that maintain the stability of the rock formation in the walls and ceiling of mineshafts. Normal practice in the cutting of mineshafts is to stabilize the rock formation by using ceiling bolts. The problem encountered is that due to shifting of the rock formation because of blasting or of the tensioning of other bolts in the area, the tension in one or more of bolts in the area may be reduced and are no longer of value in safely maintaining the stability of the rock.

In both of the above noted situations it is mandatory that the tension in the bolts be monitored. In certain instances the monitoring of the safety of the mines or of the safety transmission tower construction is required by a Federal or State Agency and such constant and required monitoring can be a costly endeavor. In transmission towers the practice at this time is to assemble the tower and induce the requisite amount of tension in the bolt using a torque wrench. After construction has been completed the towers are required to be checked at given intervals to insure that the tension in the bolts is as required. This can be a time consuming and expensive process in that each bolt must be checked using a torque wrench.

In using ceiling stabilizing bolts in a mine it has been common to use a tension indicating type washer of the type shown and described in U.S. Pat. No. 3,329,058. A typical mine ceiling bolt is installed in a predrilled hole after it has been inserted through the aperture in the tension indicating device. The head of the bolt bears against the arched portion of the tension indicating device and is tensioned there against until a proper indication is given by the device. This device is costly to make and requires that there be a substantial amount of area around the bolt hole that is smooth and perpendicular to the axis of the bolt hole. This device also requires a close and difficult inspection in order to obtain the indication as to whether the measure of the tension which remains induced in the bolt is sufficient.

SUMMARY OF THE INVENTION

The instant invention is a tension indicating device which may be of one or two piece construction and is manufactured by using relatively standard techniques. The tension indicating device includes a spring washer portion which is struck from a sheet of flat stock and then shaped into the desired configuration, i.e. frusto-conical, frusto-pyramidal, waved, etc. The actual indicating portion may be integrally formed with the washer portion or formed as a separate part. The metallic parts are then heat treated and galvanized using standard techniques and prestressed much in the manner of a spring so that it is reusable and will give a repeatable response to a loading thereon.

It is therefore an object of the present invention, to provide a tension indicating device which, by virtue of its construction, will provide a visual indication as well as a manual indication of at least one predetermined measure of the tension which exists in a bolt.

Another object of this invention is to provide a tension indicating device which will be particularly of value in the areas of power transmission tower construction and stabilizing mine ceilings and walls.

It is also an object of the present invention to provide a washer having a tension indicating means which will eliminate the necessity for the checking of the bolts by means of a torque wrench or other such device.

It is a further object of the present invention to provide a tension indicating washer having indicating means thereon which will give a quick and easy visual indication or indication manually without the necessity of careful and precise examination and without the necessity of using special tools or instruments to check the said device.

It is a further object of the present invention to provide a tension indicating washer with indicating means thereon which is visable from a distance thereby permitting inspection of the indicating device without the necessity of being immediately proximate thereto.

Still another object of the present invention is to provide a product that is designed to indicate the fact that the bolt it is associated with has "dropped below" the predetermined tension even if the tension is subsequently restored, e.g. guy wires on a high tower in a windstorm.

The present invention is disclosed by way of example in the accompanying drawings. In the drawings like reference numerals have been used to indicate the same or similar parts in the various views.

BRIEF DESCRIPTION OF THE DRAWINGS

FIG. 1 is a perspective view of the tension indicating device of the instant invention in its relaxed condition;

FIG. 2 is a perspective view of the end portion of the circumferentially disposed arm with a cap thereon;

FIG. 3 is a plan view of the relaxed indicating device of FIG. 1;

FIG. 4 is a side view of the device as depicted in FIG. 1 in its relaxed condition.

FIG. 5 is a side view of the device of FIG. 1 in association with a bolt, only the bolt head being shown, as it has partially depressed the cone 12 and indicating a first predetermined measure of tension in the bolt associated therewith;

FIG. 6 is a plan view of the indicating washer of FIG. 1 showing the relationship of the reference arm and the circumferentially disposed arm when the device is indicating a second predetermined measure of tension in the bolt associated therewith;

FIG. 7 is a side view of the tension indicating device shown in FIG. 6 showing a bolt head in relation to the device and the device indicating a second predetermined measure of tension in the bolt;

FIG. 8 is a partial section view showing the formed areas of the washer portion beneath the juncture with the arm;

FIG. 9 is a plan view of the blank from which the device of FIG. 1 is made;

FIG. 10 is a plan view of a second embodiment of the tension indicating device;

FIG. 11 is a side view of the tension indicating device of FIG. 10 in an unstressed condition;

FIG. 12 is a plan view of the tension indicating device of FIG. 10 in a stressed condition;

FIG. 13 is a side view of the tension indicating device shown in FIG. 12 showing a bolt head in relation thereto and the device in a stressed condition indicating a predetermined measure of tension in the bolt;

FIG. 14 is a plan view of a blank from which the device shown in FIG. 10 is formed;

FIG. 15 is a plan view of a blank from which another embodiment of the device is formed;

FIG. 16 is a plan view of a blank from which a further embodiment of the device is formed;

FIG. 17 is a plan view of another embodiment of the indicating device of the instant invention shown in an unstressed condition;

FIG. 18 is a side view of the unstressed tension indicating device shown in FIG. 17;

FIG. 19 is a plan view of tension indicating device of FIG. 17 in a stressed condition indicating a predetermined measure of tension in the bolt associated therewith;

FIG. 20 is a side view of the stressed device shown in FIG. 19;

DESCRIPTION OF THE PREFERRED EMBODIMENTS

Figure 21:
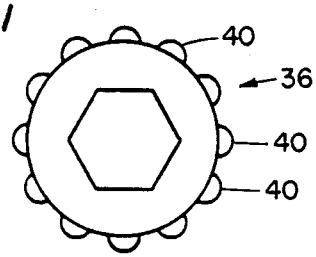
FIG. 21 is a plan view of a socket adapted for use with the tension indicating device as depicted in FIGS. 17-20.
Figure 24:
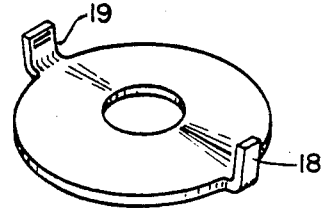
FIG. 24 is a perspective view of the washer portion of an embodiment of the invention which includes two pieces.

Referring now particularly to the embodiment of the device depicted in FIG. 1, the indicating washer is generally shown at 10. As is best seen in FIG. 9 the tension indicating washer begins as a blank struck from a flat sheet of material. The blank includes a substantially annular member 12 having an outer periphery 14 and a centrally located aperture 16. From opposite positions around the outer periphery of the annular member extend a short arm 18 and an arm generally designated at 20 which includes a short portion 22 and an arm portion 24 substantially longer and which extends generally perpendicularly from the short arm portion 22.

The indicating washer blank is preferably of metal, e.g., steel or stainless steel, and is formed preparatory to a heat treat operation. This formation includes the stamping of the annular member 12 into a generally frustoconical shape and the folding of the short arm 18 and the short portion 22, proximate their juncture to the outer periphery 14 of the annular member 12 to be generally perpendicular to a plane containing the outer periphery 14. However, as will be noted in FIG. 4 the short arm 18 and short portion 22 project outwardly and diverge slightly radially from the central axis of the central aperture in a predetermined manner. As best seen in FIG. 3 the long portion 24 of the arm 20 extends and is generally circumferentially disposed relatiave to the annular body 12. In the relaxed condition, the free end 26 of arm portion 24 is spaced inwardly relative to the peripheral edge 14 of the annular member 12 and axially from the free end 28 of short arm 18.

After the formation of the device and the heat treating and galvanizing, the device is preloaded in the same manner as a common Bellville spring. In operation, as the frustoconical portion of the tension indicating washer is forced towards a planar condition by the head of a bolt 25 engaging therewith, the short arm 18 and short portion 22 tend to deflect inwardly towards the axis of the central aperture. Thus, as 18 and 22 deflect inwardly, the free end of the long arm 24 will move outwardly relative to the central aperture 16 and downwardly relative to the plane containing the peripheral edge 14. As best seen in FIG. 7, when the tension indicating washer is indicating a maximum predetermined measure of tension in the bolt 25 the top edge of the distal end 26 of the long arm portion 24 will be in registry and juxtaposed the distal end 28 of the short arm 18. This juxtaposition and registry is obtained by the free end 26 of the long arm 24 moving downwardly relative to the plane containing the peripheral edge 14 and outwardly toward short arm 18 and the distal end 28 of the short arm 18 moving inwardly relative to the central axis of the central aperture 16. It should be recognized that by far the greater motion is downward, perhaps as great as a ten to one relationship, relative to the outward and inward movement. The exact relationship is a function of the tangent of the angle between arm 24 and the plane passing through the base of the washer along with the length of short portion 22. The inward and outward movement of portion 22 and arm 18 have been accentuated for purposes of illustration.

When using the tension indicating device as depicted in FIG. 1 in a mine shaft for bolts used for stabilizing the rock formations, it has been found desirable to be able to indicate a range of tension that is in the bolt. Thus, an additional feature of the embodiment of FIG. 1 is a notch 29 of a predetermined size in the free end 26 of the arm 24. The upper and lower boundaries 29a, 29b of this notch 29 indicate by their registration with the distal end 28 of the short arm 18 first and second predetermined measures of the tension in the bolt. The particular size of the notch in conjunction with thickness of the material forming the device determines the values of the different measures of tension. As an example, the two different indications of a measure of the tension in the bolt can be five thousand and eight thousand pounds. Thus, referring to FIGS. 4, 5 and 7, it will be appreciated that FIG. 4 is the unstressed condition which would indicate a lack of an appropriate tension in a bolt, while FIG. 5 shows the five thousand pound indication and FIG. 7 shows the eight thousand pound indication. Thus, an inspector monitoring the tension indicating device will be able to see or feel that the tension in the bolt is sufficient if the short arm 18 is aligned with or between the boundaries of the notch.

Referring to FIG. 2, it has been found that when the tension indicating device as depicted in FIG. 1 is used with bolts in the construction of transmission towers it is desirable to have the distal end of the long arm brightly colored to provide facile visual indication of when the bolt is no longer properly tensioned. Obtaining this ease of visual indication is accomplished by painting the free end 26 of arm 24 a bright color or by having a brightly colored cap 30. Cap 30 is receivable over free end 26 and has inwardly directed detents which cooperate with recesses 32 for maintaining the cap on the end of the arm. Once the cap 30 has been securely fastened to the end 26 of the arm, the position of the free end 26 of the arm can be adjusted by loading the washer portion 12 with a predetermined load and then bending the arms 18 and 20 to position the cap behind the short arm 18 and by machining the cap 30, if necessary, to align the top edge thereof with the free ends 28 of arm 18.

Referring particularly to FIGS. 4, 5 and 7 it can be seen that FIG. 4 is the relaxed condition of the tension indicating washer of FIG. 1. In FIG. 5 the tension indicating washer is indicating a first position where, in the example given above, 5,000 pounds of tension would have been induced in the bolt while in FIG. 7 a second position is shown indicating, in the above example, the existence of 8,000 pounds of tension. FIGS. 3 and 6 show, respectively, the position of the ends of the arms 26 and 28 when the indicating device is unstressed and loaded to its indicating limit.

Referring now to the embodiment as depicted in FIGS. 10–14, FIG. 14 shows the blank from which this embodiment of the tension indicating device is formed. The blank includes an annular member 12 with an outer periphery 14 and a centrally disposed aperture 16 identical to that as shown in FIG. 1. This embodiment, however, includes a pair of arm members 20', 20' wherein each arm member 20' includes two portions 22' and 24'. In the blank each arm member 20' has a short portion 22' extending in opposite directions radially from the outer periphery 14 of the annular member 12 with each short portion 22' attached substantially perpendicular to the plane lying on a tangent to the outer periphery 14. The body 12 is formed into its frustoconical configuration; the short portions are bent generally upwardly to a position slightly off of normal to the plane passing through the base of member 12; and long arm portions 24 are bent into a circular configuration with the distal ends 26' of the long arm portions 24' being in the same general relationship along the outer periphery 14 of the annular member 12. The long arm portions 24' of each of the arms 20' are circumferentially disposed and extend about one-fourth of the circumferential distance of the annular member 12. Referring now to FIGS. 11 and 13, it is seen therein that as the frustoconical portion of the tension indicating device is forced towards the planar condition by the engagement of the head of the bolt 25, shown in reduced form for clarity, inserted through the central aperture, the ends 26' of the arm portions 24' move towards one another until juxtaposed, thus, indicating a predetermined tension in the bolt. As is understood the distal ends 26' of the long circumferentially disposed arm portions 24' move in a predetermined manner towards one another, and as seen in these figures are juxtaposed one another as the predetermined amount of tension induced in the bolt 25 is arrived at. In this particular embodiment it is possible to determined in a predetermined manner the amount of tension induced in the bolt by using a feeler gauge to measure the gap or distance between the distal ends 26' of the circumferentially disposed arms 24'. Accordingly, the further apart the arms are the less the amount of tension in the bolt and the closer they are the greater the tension in the bolt. Again, adjustments to the device of this embodiment would be accomplished in the same manner as described for the embodiment of FIG. 1.

Referring now to FIGS. 15 and 16, a ring 34 or pair of ring segments 34', 34' are integrally formed with short arm 22'' and cooperate with the short arm 18' or 18'', respectively, to indicate in the manner as described in detail above with respect to the previous embodiments. The short leg 18' illustrated in FIG. 15 includes a plurality of notches for indicating various predetermined tensions in the bolt by the alignment of the top edge of the ring 34 with one of the notch boundaries. The short arm 18'' of FIG. 16 is dimensioned to fit between the arms 34' such that the top edge of each segment 34' will be aligned with the free end 28 of arm 18 when the device is indicating a maximum predetermined measure of tension in the bolt 25.

Referring now to the tension indicating device as shown in FIGS. 17–20 and the special tool 36 which is shown in FIG. 21 for cooperating with the embodiment of these figures. The tension indicating device of this embodiment is essentially the device as depicted in FIG. 1. The distal end 28'' of the short arm 18'' is chamfered 42 as is the bottom edge 44 of the distal end 26'' of the circumferential disposed arm to aid in directing the free ends over each other as the tension indicating washer is compressed and brought into its indicating condition. Additionally, the circumferentially disposed arm portion 24'' includes an inward projection 38 engageable intermittently by tool 36 to force the free end 26'' of the circumferentially disposed arm 24'' outwardly. One type of tool, as seen in FIG. 21, is a socket type tool which includes around the outer periphery thereof outwardly extending projections 40 which will intermittently engage the inward projection 38 as the socket tool 36 engages the head of the bolt and is rotated relative to the tension indicating device. As seen in FIGS. 17 and 18 the tension indicating device is in its relaxed condition and in FIGS. 19 and 20 the device is shown indicating in a predetermined manner a predetermined measure of the tension that has been induced in the bolt. In operation, as the bolt 25 is having torque induced therein the chamfers will cause arm 24'' to move laterally to the outside surface of short arm 18''. If used, the rotation of the special socket tool 36 and engagement of the outward projections 40 with the inward projection 38 on the circumferentially disposed arm 24'' will assist in moving the end 26'' of the arm outwardly so that as the frustoconical portion 12 of the washer portion is compressed towards a planar condition the free end 26'' of the arm 24'' is brought downwardly and is forced outwardly so as to insure its being on the outside of the short arm 18''. In this embodiment, as the tension in the bolt is released the distal end 26'' of the circumferentially disposed arm 24'' will snap upwardly and over the end 28" of the short arm 18" giving a clear indication of a lack of tension in the bolt 25.

Figure 22:
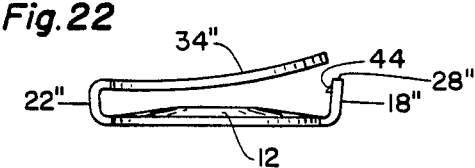
FIG. 22 is a side view of another embodiment of the instant invention.

In FIG. 22, an embodiment is shown wherein the short arm 18 includes a hook 44 and an arched arm segment or inversely arched ring 34" which is deflected away from the washer portion 12. In operation, the bolt associated with the device is tensioned to a predetermined measure causing the end 28" of arm 18" to move inwardly toward the central aperture 16 while the corresponding inward movement of short portion 22" causes that portion of ring 34" proximate the arm 18" to move towards the washer portion 12 and towards the distal end 28" of arm 18". When the predetermined measure of tension has been induced in the bolt, the ring 34" is further distorted and that portion of ring 34" proximate the distal end 28" is manually forced beneath and caught by hook 44. Thus, when the measure of tension in the bolt falls below a predetermined amount the short arm will move outwardly a distance sufficient to release ring 34" which will then spring out to give a clear indication of failure. This then is a "yes" or "no" indicator which might be particularly applicable to such applications as guy wires. These wires have constantly changing tensions as the wind blows. It is important that the minimum tension be maintained above some pre-engineered low limit. Thus in a severe windstorm if the tension drops below some preset limit (higher than the safe low limit) the arm pops up. At a later point in time when there is no wind and the tension is back up, but the arm is still up in a disengaged position, the inspection crew is alerted that there was a low tension problem in that particular guy wire.

Figure 23:
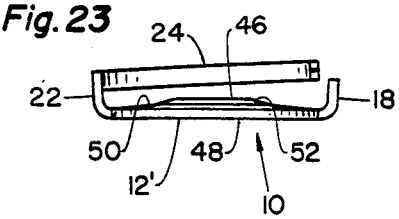
FIG. 23 is a side view of a tension indicating washer of the instant invention wherein the bearing surfaces around the central aperture are of a configuration having a defined shoulder.
Figure 26:
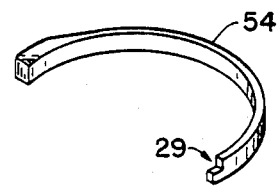
FIG. 26 is a perspective view of an arm for use with the washer portion shown in FIG. 24.
Figure 27:
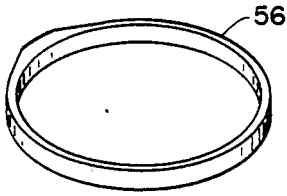
FIG. 27 is a perspective view of an annular member for use with the washer portion shown in FIG. 24.
Figure 28:
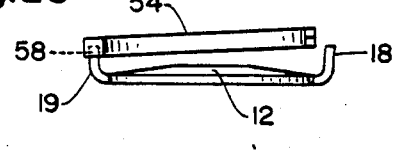
FIG. 28 is a side view showing the arm of FIG. 26 assembled to the washer portion of FIG. 24.

Referring now to FIGS. 8 and 23, there are shown modified configurations of the frustoconical washer portion 12 and 12' of the tension indicating device 10. Applicant contemplates in FIG. 23 including bearing surfaces 46, 48 in the frustoconical portion around the outer periphery and generally being defined on the bottom surface and around the centrally located aperture on the top surface. These bearing surfaces 46, 48 are of significance in using the tension indicating device with a surface that is not perpendicular to the bolt. In these situations it is understood that up to 10 degrees of irregularity relative to the longitudinal axis of the bolt may be accommodated by the inclusion of the bearing surfaces described herein. As the head of the bolt engages the bearing surface around the centrally located aperture the bearing surface around the periphery of the annular member on the opposite side will engage the angled surface and receive the compressive force applied by the bolt in a manner such that the concavity of the frustoconical washer portion will be tending towards a planar condition but yet the movement of the arm will be as if the device is engaging a directly perpendicular surface. This is accomplished by having the stepped cone configuration as shown wherein the outer part in 50 is a segment of a larger cone than the inner portion 52. In FIG. 8 there is shown relieved area R where the arm 20 joins the washer portion 12. Preferably this area is formed and permits the device to be used with a surface that has irregularities, e.g., bumps or ribs. It should be appreciated that a surface irregularity engaging the peripheral edge proximate to the point where one of the arms 18 and 20 joins portion 12 would result in inaccurate indication of the tension in the bolt. Accordingly, providing a relieved area avoids interference with the predetermined response of the device to a tensioned bolt.

Figure 25:
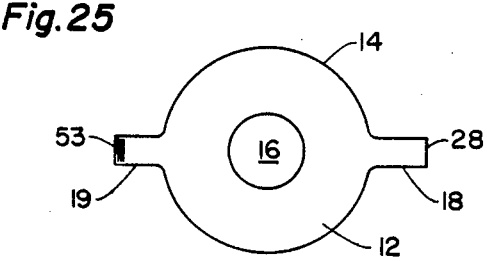
FIG. 25 is a plan view of the blank from which the device shown in FIG. 24 is formed.

FIGS. 24–28 indicate an embodiment of the tension indicating device which includes a washer portion 12 and a pair of short arms 18 and 19. FIG. 25 shows the blank from which the washer portion with substantially perpendicular arms 18 and 19 is formed. The device has either an arm 54 or a ring 56 attached to arm 19 thereby forming a device which operates generally in the same manner as the device shown in FIGS. 1 and 15, respectively. The arm 54 and ring 56 may be of any material but are preferably molded of a plastic. To facilitate attachment to the washer portion 12 short arm 19 has grooves 53 therein and the arm 54 or ring 56 has a socket 58 formed therein for receiving the portion of the arm 19 having the grooves. Secure attachment of the arm or ring may be accomplished by any of various known expedients including chemical bonding and sonic welding. It should be noted that calibration of the device may be accomplished as indicated above, e.g., loading of the washer portion and machining of the plastic which should be done during the assembly thereof.

In the various embodiments described herein the member 12 has been variously described as being an annular blank formed into a frustoconical configuration. It should be specifically noted that earlier it was pointed out that the spring washer portion could be formed into a multiplicity of shapes. It should be further noted that the circumferentially disposed arm 24 can also be linear in configuration when used with a rectilinear spring portion.

Applicant has disclosed a device for indicating the pressure of a predetermined measure of tension in a member such as a bolt associated therewith. When used in mines the devices are easily inspected either visually or manually and when used in the construction of transmission towers it is contemplated that inspections be made by helicopter using known optical and visual techniques. The various structural features of the various embodiments are considered to be universal within the concept disclosed and accordingly the teaching associated with one embodiment may be used with any of the others.

Various changes and modifications and other alternatives will become apparent from the reading of the foregoing specification. Accordingly, it is intended that all such changes and modifications and other alternatives as are covered by the appended claims are intended to be included within the concept of the instant invention.

We claim:

1. A tension indicating washer for indicating the loss of a predetermined measure of tension in a bolt comprising, a spring washer having a centrally disposed aperture for receiving a bolt therethrough and indicating means providing for visual as well as manual indication of the presence of said predetermined amount of tension in said bolt, said indicating means including axially disposed reference member extending from proximate a margin of said washer and arm member cooperating with said reference member for indicating in a first position a predetermined measure of the amount of tension in the bolt and in a second position a tension less than said predetermined measure, said arm member including first and second portions wherein said second portion is supported axially from said washer by attachment of one end of said first portion proximate to the outer margin of said washer opposite said reference member, said second portion having a free end biased generally away from said washer wherein said free end is spaced from said reference member in a predetermined manner, at least one of said free end and said reference member including cooperable means for manually latching said free end of said second portion relative to said reference member when said bolt is tensioned a predetermined amount, whereby as force is applied to the washer by increased tension in the bolt the washer generally deflects towards a planar condition causing the end of said second portion to move in a predetermined manner to enable it to be manually manipulated into a predetermined latch position relative to said reference member and whereby when said tension in said bolt is less than said predetermined amount said free end will be released from said latched condition to indicate that the measure of tension in said bolt has fallen below said predetermined amount.

2. A washer as set forth in claim 1 wherein said cooperable means includes a tang protruding generally inwardly from said reference member for engaging said free end, whereby when the tension in said bolt is less than said predetermined measure of tension said reference member releases said free end by moving radially outwardly thereby permitting said bias to spring said free end to a position indicating that tension in said bolt has dropped below said predetermined measure of tension.

* * * * *